(12) United States Patent
Eisenhut et al.

(10) Patent No.: US 8,470,226 B2
(45) Date of Patent: Jun. 25, 2013

(54) CREATING CONDUIT END CAPS IN THE FIELD

(75) Inventors: Eric D. Eisenhut, Easton, PA (US); Benjamin J. Ache, Bethlehem, PA (US)

(73) Assignee: Medhesives, Inc., Ithaca, NY (US)

( * ) Notice: Subject to any disclaimer, the term of this patent is extended or adjusted under 35 U.S.C. 154(b) by 2208 days.

(21) Appl. No.: 11/294,332

(22) Filed: Dec. 6, 2005

(65) Prior Publication Data

US 2006/0121148 A1      Jun. 8, 2006

Related U.S. Application Data

(60) Provisional application No. 60/632,936, filed on Dec. 6, 2004.

(51) Int. Cl.
 B29C 65/70 (2006.01)
 B29C 39/02 (2006.01)
 B29C 35/08 (2006.01)

(52) U.S. Cl.
 USPC ............ 264/255; 264/265; 264/267; 264/496

(58) Field of Classification Search
 USPC .................. 277/314, 316; 264/255, 259, 265, 264/267, 494, 496; 138/96 R
 See application file for complete search history.

(56) References Cited

U.S. PATENT DOCUMENTS

| | | | | |
|---|---|---|---|---|
| 2,467,911 A * | 4/1949 | Reilly | ............................ | 285/302 |
| 3,134,008 A * | 5/1964 | Finn | ............................... | 219/523 |
| 3,523,607 A * | 8/1970 | Thompson et al. | ........... | 206/221 |
| 3,559,660 A * | 2/1971 | Rollins | ......................... | 138/149 |
| 3,940,884 A * | 3/1976 | Mason, Jr. | ........................ | 47/32 |
| 4,083,902 A * | 4/1978 | Clyde | ............................ | 264/420 |
| 4,194,750 A * | 3/1980 | Sovish et al. | ................. | 277/615 |
| 4,287,386 A * | 9/1981 | Scahill et al. | .................... | 174/76 |
| 4,288,471 A * | 9/1981 | Lanier | ............................ | 427/120 |
| 4,332,975 A * | 6/1982 | Dienes | ............................. | 174/76 |
| 4,444,996 A * | 4/1984 | Robertson | .................... | 174/74 A |
| 4,576,661 A * | 3/1986 | Persson | ........................... | 156/48 |
| 4,629,285 A * | 12/1986 | Carter et al. | .................. | 385/128 |
| 4,790,544 A * | 12/1988 | Kemp | ........................... | 277/314 |
| 5,072,073 A * | 12/1991 | Becker et al. | .................... | 174/76 |

(Continued)

FOREIGN PATENT DOCUMENTS

GB      2064679 A  *  6/1981
GB      2191902 A  *  12/1987

OTHER PUBLICATIONS

Web page characterizing epoxy resin potting compound as being heat radiation curable: o http://web.archive.org/web/20030201061241/http://www.pottingsolutions.com/my+site/Suppliers/EP+low+cost.htm o available at http://web.archive.org/web/*/http://pottingsolutions.com/my%20site/Suppliers/EP%20low%20cost.htm.*

*Primary Examiner* — Ryan Ochylski
(74) *Attorney, Agent, or Firm* — Welsh Flaxman & Gitler LLC

(57) ABSTRACT

A method for forming an end cap includes cleaning an exposed end of a conduit upon which the end cap will be formed, inserting a backing material into the exposed end of the conduit to the desired resin depth, dispensing the resin into the conduit, spreading the resin across the backing material, curing the resin with a radiation source and applying additional layers of resin and curing until the resin is flush with or forms a convex surface relative to an exposed end of the conduit.

20 Claims, 1 Drawing Sheet

Reflective backing material to control depth of paste applied

U.S. PATENT DOCUMENTS

| | | | |
|---|---|---|---|
| 5,093,048 A * | 3/1992 | Kagan | 264/1.25 |
| 5,335,697 A * | 8/1994 | Botsolas | 138/149 |
| 5,423,630 A * | 6/1995 | Imoto et al. | 405/184.2 |
| 5,634,711 A * | 6/1997 | Kennedy et al. | 362/119 |
| 5,727,597 A * | 3/1998 | Fisco | 138/98 |
| 5,856,425 A * | 1/1999 | Rosenfeld et al. | 528/289 |
| 6,065,965 A * | 5/2000 | Rechmann | 433/29 |
| 6,102,696 A * | 8/2000 | Osterwalder et al. | 433/29 |
| 6,148,689 A * | 11/2000 | Uneme | 74/502.1 |
| 6,161,989 A * | 12/2000 | Kotani et al. | 405/151 |
| 6,193,910 B1 * | 2/2001 | Ikai et al. | 252/512 |
| 6,541,537 B1 * | 4/2003 | Catena | 522/150 |
| 2002/0044749 A1 * | 4/2002 | Koike et al. | 385/95 |
| 2002/0166693 A1 * | 11/2002 | Dancy | 174/76 |
| 2004/0021255 A1 * | 2/2004 | Bilanin et al. | 264/494 |

* cited by examiner

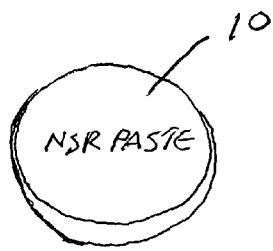
Fig1. Container Radiation-cure paste
Fig 2. Radiation cure paste, very viscous
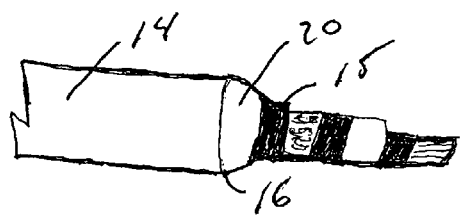
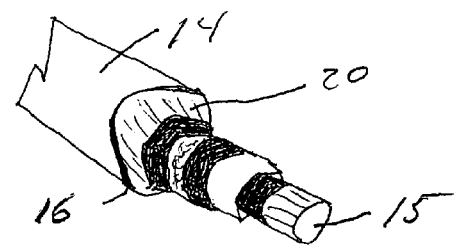
Fig 3. Side view of conduit with water-tight End cap formed by radiation cure paste
Fig 4. Front view of conduit with water-tight end cap
Figure 5: Reflective backing material to control depth of paste applied
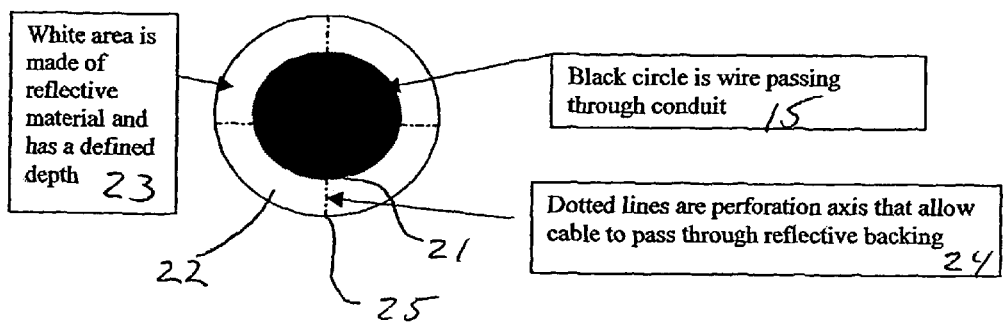

CREATING CONDUIT END CAPS IN THE FIELD

CROSS REFERENCE TO RELATED APPLICATIONS

This application is based upon U.S. Provisional Patent Application Ser. No. 60/632,936, filed Dec. 6, 2004, entitled "CREATING CONDUIT END CAPS IN THE FIELD"

BACKGROUND OF THE INVENTION

1. Field of the Invention

The present invention relates to photo curable resins and a method which can be used in the field to create water tight seals at the end of pipes and conduits.

2. Description of the Prior Art

It is common in the building industry to have conduits carrying various types of cables that run through the exterior of a building. Water will often unintentionally pass through the conduits along with the cables. This creates a problem for the facility. It is difficult to seal the ends of these conduits so as to prevent water or other foreign materials from passing through the conduits.

Typical radiation curing resins are minimally viscous materials that flow rather easily. This is due to the fact the resins are often used as sealants, thin coatings, or as adhesives in controlled industrial assembly applications. Applying these resins in the field to repair and/or create seals is troublesome. Field use conditions do not lend themselves to such minimally viscous materials as the resins generally will run off of the intended repair surface prior to introducing the radiation curing source.

SUMMARY OF THE INVENTION

The present invention relates to a method for forming an end cap, including cleaning an exposed end of a conduit upon which the end cap will be formed and then inserting a backing material into the exposed end of the conduit to the desired resin depth. Thereafter, dispensing the resin into the conduit and curing the resin with a radiation source.

Further the present invent provides the step of cleaning the surface of a cable passing through the conduit around which the end cap is formed.

Still further the present invent provides having the backing material include a reflective surface used for curing the resin from a side opposite the radiation source and the backing material includes at least one perforated line extending from a center edge to an outer edge of the backing material such that the backing material can be separated from itself and fit about a cable extending into the conduit.

Yet further the present invention provides the step of spreading the resin across the backing material once dispensed, wherein the resin is spread to a depth of ⅛ to ¹⁄₁₆ of an inch and then cured to form a first layer and then applying additional layers of resin and curing until the resin is flush with or forms a convex surface relative to an exposed end of the conduit.

It is an object of the present invention to provide radiation curing resins that can be tailored to various viscosities such that they are functional for various in the field repairs.

It is also an object of the present invention to create radiation curing resins with the consistency of paste. These resins will allow rapid repairs to be completed even on difficult vertical surfaces where gravity is working against the user.

Further, it is an object of the present invention to provide resins which cure rapidly under extreme temperature and moisture conditions and have tailored viscosities such that an end-cap on a conduit can be created in the field. Resins used for the field formable end-caps for cable carrying conduits will remain in place while the end-cap is formed around the cables carried through the conduit.

BRIEF DESCRIPTION OF THE DRAWINGS

FIG. 1 shows a container of photo curable paste to be used in accordance with the present invention.

FIG. 2 shows the photo curable paste removed from the container.

FIG. 3 is a side view of a water-tight end cap formed in a conduit.

FIG. 4 is a end view of the water-tight end cap shown in FIG. 3.

FIG. 5 is a diagram showing a reflective backing material used to control the depth of the resin paste to be cured.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

FIG. 1 shows a container 10 of photo curable resin paste to be used in accordance with the present invention. The paste is maintained in the opaque container so as to not be exposed to light prior to use. FIG. 2 shows the photo curable resin paste removed from the container 10 and ready to be formed into an end cap 20. In accordance with a preferred embodiment of the present invention, the resin 12 is an acrylate resin with photo curable materials modified with a filler material that does not settle during storage (polymer filler, silica filler or similar filler). More particularly, the resin 12 is methacrylate resin with UV or visible light curable photo-initiators. Depending on geometry of filler material, filler loading can be as high as 50% by weight and as low as 10% by weight in order to achieve desired viscosity. In general, filler materials for resins typically are silica, glass beads polymers, gypsum, talcum, or carbon black. Especially preferred is a polymer filler material that does not settle over time, but remains suspended in the resin in a uniform fashion.

Acrylate resins in general comprise a class of thermoplastic or thermoset polymers or copolymers. These oligomers polymerize readily in the presence of light, heat or catalysts. In general, acrylate resins must be stored or shipped with inhibitors present in the composition to avoid spontaneous and explosive polymerization. Acrylate resins vary in physical properties from very hard brittle solids to fibrous elastomeric structures to viscous liquids, depending upon the monomer used and the method of polymerization employed. The polymer may include many different kinds of unsaturated monomer, and is selected from the group consisting of: methyl methacrylate, butyl acrylate, hydroxyethylacrylate, methyl acrylate, ethyl acrylate, isopropyl acrylate, n-butyl acrylate, s-butyl acrylate, t-butyl acrylate, 2-ethylhexyl acrylate, cyclohexyl acrylate, 3,3,5-trimethycyclohexyl acrylate, 2-methoxyethyl acrylate, 2-ethoxyethyl acrylate, 2-butoxyethyl acrylate, acrylonitrile, methyl methacrylate, ethyl methacrylate, isopropyl methacrylate, n-butyl methacrylate, s-butyl methacrylate, t-butyl methacrylate, n-hexyl methacrylate, n-octyl methacrylate, lauryl methacrylate, tridecyl methacrylate, stearyl methacrylate, phenyl methacrylate, cyclohexyl methacrylate, 3,3,5-trimethylcyclohexyl methacrylate, isobornyl methacrylate, bromoethyl methacrylate, 2-hydroxyethyl methacrylate, hydroxypropyl methacrylate, glycidyl methacrylate, methoxyethyl methacrylate, ethoxyethyl methacrylate, diethyl methyleneglutarate, isocyanatoethyl methacrylate, methacrylic acid, methacrylonitrile, 2-(diethylphosphato)ethyl methacrylate, 1-diethylphosphonoethyl methacrylate, ethylene, butadiene, vinylidene chloride, and n-vinylpyrrolidinone.

In general, the radiation curing process requires a UV or visible lamp that directs desired light onto the formulated product. Photoinitiators absorb the desired energy from the light source, causing a chemical reaction that quickly converts the liquid into a solid, cured film. The initiators for photo polymerization are generally known from the literature, e.g. U.S. Pat. No. 5,354,827 and U.S. Pat. No. 4,437,836, which are incorporated by reference. Preferably, they are mono- or dicarbonyl compounds such as benzophenone; benzoin and its derivatives, in particular benzoin methyl ether; benzil and benzil derivatives; other dicarbonyl compounds, such as diacetyl, 2,3-pentanedione and .alpha.-diketo derivatives of norbornane and substituted norbornanes; metal carbonyls, such as pentacarbonyl manganese; or quinones, such as 9,10-phenanthrenequinone and naphthoquinone. The preferred photo-initiator is camphorquinone.

The preferred resin paste 12 is sensitive to light at 470 nm wavelengths and requires blue light for curing to be most efficient. However, those skilled in the art will appreciate that various curing wavelengths may be employed without departing from the spirit of the present invention.

The resin 12 in accordance with the present invention has a viscosity range of approximately 200,000 cP to 1,000,000 cP, and typically has a viscosity greater than 500,000 cp.

In the production of an end-cap 20 in accordance with the present invention, a backing material 22 is used so that the depth of resin paste 12 applied is controlled. The backing material 22 can have a reflective surface 23 so that the radiation source will be reflected back onto the resin 12 thus curing the resin 12 from two sides and speeding the time of cure. The reflective backing material 22 is prepared such that it is dimensioned to fit snuggly into the conduit 14 and retained by friction when inserted therein. The backing material will include perforated lines at multiple places extending from the center edge 21 to the outer edge 25 of the backing material 22. The perforated lines 24 allow for the backing material 22 to be separated and then fit around the cable 15 or other objects within the conduit. The reflective surface 23 of the backing material 22 is formed by forming a coating on the backing material 22. The coating will have similar properties to the reflective performance of aluminum.

The procedure for forming an end cap 20 will be discussed as follows. First, the surface inside the conduit 14 as well as the surface of the object/cable 15 passing through the conduit will be cleaned. Cleaning can be accomplished by ways typically associated with bonding resins to surfaces. Such methods include wiping, sanding, scraping, wire-brushing and treating with high pressure air or solvents. Second, the backing material 22 is inserted into conduit 14 such that it is ⅛ inch to 2 inches inside the conduit 14, optimally it will be ½ inch inside the conduit 14. When inserted the reflective surface 23 will face outward towards the end 16 of the conduit 14. Third, the resin 12 is dispensed into the conduit 14 either by a syringe, squeeze tube, or putty knife and then spread evenly across the backing material 22 and around the objects/cable 15 within the conduit 14. Spreading of the resin 12 is accomplished by mechanically manipulating the resin 12 with a putty knife or similar instrument. Resin paste 12 should be spread to a depth of ⅛ to 1/16 of an inch. Fourth, the spread resin paste 12 is cured in place using the radiation source described below to form a first layer. Additional layers of resin 12 are added in a similar fashion until the desired thickness is achieved. Generally, the layers are added until the resin is flush with or forms a convex surface relative to the end of the conduit.

In addition, a radiation source, such as an LED flashlight, is suitable to cure the resin to various depths and sufficient speed (seconds to minutes) even under adverse temperature and moisture conditions. Although portable radiation sources such as LED lighting are effective, it is also possible to achieve functional cures using sunlight.

While the preferred embodiment has been shown and described, it will be understood that there is no intent to limit the invention by such disclosure, but rather, is intended to cover all modifications and alternate constructions falling within the spirit and scope of the invention.

The invention claimed is:

1. A method for forming an end cap, comprising:
cleaning an inside surface of an exposed end of a conduit upon which the end cap will be formed;
inserting a backing material into the exposed end of the conduit to a desired resin depth;
dispensing a photo curable resin into the exposed end of the conduit; and
curing the resin with a radiation source to form the end cap.

2. The method according to claim 1, wherein the step of cleaning includes cleaning the surface of a cable passing through the conduit around which the end cap is formed.

3. The method according to claim 1, wherein the backing material includes a reflective source used for curing the resin from a side opposite the radiation source.

4. The method according to claim 1, wherein the backing material is inserted such that it is ⅛ inch to 2 inches inside the conduit.

5. The method according to claim 4, wherein the backing material is inserted such that it is around ½ inch deep inside the conduit.

6. The method according to claim 1, wherein the backing material includes at least one perforated line extending from a center edge to an outer edge of the backing material such that the backing material can be separated from itself and fit about a cable extending into the conduit.

7. The method according to claim 1, wherein the backing material includes a reflective surface and the reflective surface faces outward toward the exposed end of the conduit.

8. The method according to claim 7, wherein the backing material includes at least one perforated line extending from a center edge to an outer edge of the backing material such that the backing material can be separated from itself and fit about a cable extending into the conduit.

9. The method according to claim 7, wherein the step of dispensing is followed by spreading the resin across the backing material.

10. The method according to claim 9, wherein the resin is spread to a depth of ⅛ to 1/16 of an inch and then cured to form a first layer.

11. The method according to claim 10, further including the step of applying additional layers of resin and curing until the resin is flush with or forms a convex surface relative to of the exposed end of the conduit.

12. The method according to claim 9, wherein the resin is cured to form a first layer.

13. The method according to claim 12, further including the step of applying additional layers of resin and curing until the resin is flush with or forms a convex surface relative to the exposed end of the conduit.

14. The method according to claim 1, wherein the resin is a resin paste.

15. The method according to claim 1, wherein the radiation source is an LED flashlight.

16. The method according to claim 14, wherein the resin paste is methacrylate resin with UV or visible light curable photo-initiators.

17. The method according to claim 14, wherein the resin paste includes a filler.

18. The method according to claim 14, wherein the resin paste includes an acrylate resin selected from the group consisting of methyl methacrylate, butyl acrylate, hydroxyethylactylate, methyl acrylate, ethyl acrylate, isopropyl acrylate, n-butyl acrylate, s-butyl acrylate, t-butyl acrylate, 2-ethylhexyl acrylate, cyclohexyl acrylate, 3,3,5-trimethycyclohexyl actylate, 2-methoxyethyl acrylate, 2-ethoxyethyl acrylate, 2-butoxyethyl acrylate, acrylonitrile, methyl methacrylate, ethyl methacrylate, isopropyl methacrylate, n-butyl methacrylate, s-butyl methacrylate, t-butyl methacrylate, n-hexyl methacrylate, n-octyl methacrylate, lautyl methacrylate, tridecyl methacrylate, stearyl methacrylate, phenyl methacrylate, cyclohexyl methacrylate, 3,3,5-trimethylcyclohexyl methacrylate, isobornyl methacrylate, bromoethyl methacrylate, 2-hydroxyethyl methacrylate, hydroxypropyl methacrylate, glycidyl methacrylate, methoxyethyl methacrylate, ethoxyethyl methacrylate, diethyl methyleneglutarate, isocyanatoethyl methacrylate, methacrylic acid, methacrylonitrile, 2-(diethylphosphato)ethyl methacrylate, 1-diethylphosphonoethyl methacrylate, ethylene, butadiene, vinylidene chloride, and n-vinylpyrrolidinone.

19. A method for forming an end cap, comprising:
    cleaning an inside surface of an exposed end of a conduit upon which the end cap will be formed;
    inserting a backing material into the exposed end of the conduit to a desired resin depth;
    dispensing a photo curable resin into the conduit;
    spreading the resin across the backing material;
    curing the resin with a radiation source; and
    applying additional layers of resin and curing until the resin is flush with or forms a convex
    surface relative to the exposed end of the conduit.

20. The method according to claim 19, wherein the backing material includes a reflective surface used for curing the resin from a side opposite the radiation source.

* * * * *

UNITED STATES PATENT AND TRADEMARK OFFICE
CERTIFICATE OF CORRECTION

| | | |
|---|---|---|
| PATENT NO. | : 8,470,226 B2 | Page 1 of 1 |
| APPLICATION NO. | : 11/294332 | |
| DATED | : June 25, 2013 | |
| INVENTOR(S) | : Eric D. Eisenhut and Benjamin A. Ache | |

It is certified that error appears in the above-identified patent and that said Letters Patent is hereby corrected as shown below:

In the Claims:

Column 4, lines 64-67, cancel the text beginning with "11. The method" to and ending "conduit.", and insert the following claim:

11. The method according to claim 10, further including the step of applying additional layers of resin and curing until the resin is flush with or forms a convex surface relative to the exposed end of the conduit.

Column 5, line 16, cancel the text beginning with "18. The method" to and ending "n-vinylpyrrolidinone." in column 6, line 11, and insert the following claim:

18. The method according to claim 14, wherein the resin paste includes an acrylate resin selected from the group consisting of methyl methacrylate, butyl acrylate, hydroxyethylacrylate, methyl acrylate, ethyl acrylate, isopropyl acrylate, n-butyl acrylate, s-butyl acrylate, t-butyl acrylate, 2-ethylhexyl acrylate, cyclohexyl acrylate, 3,3,5-trimethycyclohexyl acrylate, 2-methoxyethyl acrylate, 2-ethoxyethyl acrylate, 2-butoxyethyl acrylate, acrylonitrile, methyl methacrylate, ethyl methacrylate, isopropyl methacrylate, n-butyl methacrylate, s-butyl methacrylate, t-butyl methacrylate, n-hexyl methacrylate, n-octyl methacrylate, lauryl methacrylate, tridecyl methacrylate, stearyl methacrylate, phenyl methacrylate, cyclohexyl methacrylate, 3,3,5-trimethylcyclohexyl methacrylate, isobornyl methacrylate, bromoethyl methacrylate, 2-hydroxyethyl methacrylate, hydroxypropyl methacrylate, glycidyl methacrylate, methoxyethyl methacrylate, ethoxyethyl methacrylate, diethyl methyleneglutarate, isocyanatoethyl methacrylate, methacrylic acid, methacrylonitrile, 2-(diethylphosphato)ethyl methacrylate, 1-diethylphosphonoethyl methacrylate, ethylene, butadiene, vinylidene chloride, and n-vinylpyrrolidinone.

Signed and Sealed this
Sixth Day of August, 2013

Teresa Stanek Rea
*Acting Director of the United States Patent and Trademark Office*